(12) United States Patent
Yamaguchi (10) Patent No.: US 8,974,331 B2
(45) Date of Patent: Mar. 10, 2015

(54) BICYCLE DERAILLEUR

(71) Applicant: Shimano Inc., Sakai, Osaka (JP)

(72) Inventor: Sota Yamaguchi, Osaka (JP)

(73) Assignee: Shimano Inc., Osaka (JP)

( * ) Notice: Subject to any disclaimer, the term of this patent is extended or adjusted under 35 U.S.C. 154(b) by 159 days.

(21) Appl. No.: 13/709,364

(22) Filed: Dec. 10, 2012

(65) Prior Publication Data

US 2014/0162817 A1    Jun. 12, 2014

(51) Int. Cl.
| | | |
|---|---|---|
| F16H 59/00 | (2006.01) | |
| F16H 61/00 | (2006.01) | |
| F16H 63/00 | (2006.01) | |
| F16H 9/06 | (2006.01) | |
| B62M 9/122 | (2010.01) | |
| B62M 25/08 | (2006.01) | |

(52) U.S. Cl.
CPC ................. *F16H 9/06* (2013.01); *B62M 9/122* (2013.01); *B62M 25/08* (2013.01)
USPC .............................................. 474/82; 474/80

(58) Field of Classification Search
CPC ................................. F16H 9/16; B62M 9/126
USPC ...................................................... 474/80, 82
See application file for complete search history.

(56) References Cited

U.S. PATENT DOCUMENTS

| | | | | |
|---|---|---|---|---|
| 6,162,140 A * | 12/2000 | Fukuda | ............................ | 474/70 |
| 6,979,009 B2 * | 12/2005 | Ichida et al. | .................... | 280/238 |
| 6,997,835 B2 * | 2/2006 | Fukuda | ............................ | 474/82 |
| 7,001,294 B2 * | 2/2006 | Fukuda | ......................... | 474/102 |
| 7,004,862 B2 * | 2/2006 | Fukuda | ......................... | 474/102 |
| 7,442,136 B2 * | 10/2008 | Ichida et al. | .................... | 474/82 |
| 7,704,173 B2 * | 4/2010 | Ichida et al. | .................... | 474/82 |
| 7,892,122 B2 * | 2/2011 | Fukuda | ............................ | 474/82 |
| 7,942,768 B2 * | 5/2011 | Takamoto et al. | .............. | 474/82 |
| 8,066,597 B2 * | 11/2011 | Sakaue | ............................ | 474/82 |
| 2004/0014541 A1 * | 1/2004 | Dal Pra | ............................ | 474/70 |
| 2004/0063528 A1 * | 4/2004 | Campagnolo | .................... | 474/70 |
| 2004/0092347 A1 * | 5/2004 | Fukuda | ............................ | 474/70 |
| 2005/0187048 A1 * | 8/2005 | Fukuda | ............................ | 474/70 |
| 2005/0187050 A1 * | 8/2005 | Fukuda | ............................ | 474/80 |
| 2005/0192137 A1 * | 9/2005 | Ichida et al. | .................... | 474/70 |
| 2005/0192139 A1 * | 9/2005 | Ichida et al. | .................... | 474/80 |
| 2006/0189421 A1 * | 8/2006 | Ichida et al. | .................... | 474/80 |
| 2006/0189422 A1 * | 8/2006 | Ichida et al. | .................... | 474/80 |
| 2007/0184925 A1 * | 8/2007 | Ichida et al. | .................... | 474/80 |
| 2008/0026891 A1 * | 1/2008 | Oseto | ............................. | 474/82 |
| 2008/0132364 A1 * | 6/2008 | Ichida et al. | .................... | 474/70 |
| 2008/0227572 A1 * | 9/2008 | Sakaue | ............................ | 474/82 |
| 2009/0021556 A1 * | 1/2009 | Zhao et al. | ...................... | 347/36 |
| 2009/0291789 A1 * | 11/2009 | Ishikawa et al. | ................ | 474/82 |

* cited by examiner

*Primary Examiner* — Henry Liu
(74) *Attorney, Agent, or Firm* — Global IP Counselors (57) ABSTRACT

A bicycle derailleur includes a base member, a movable member, a motor unit, a linkage and a saver mechanism. The linkage includes a first link that includes a first linking member and a second linking member. The first linking member is pivotally connected to the movable member. The second linking member is pivotally connected to the base member, and is attached to the first linking member. The saver mechanism includes an output member movably operated by the motor unit, a drive link movably mounted on the first link between a drive transmitting position that connects a drive force of the motor to the first link and a non-drive transmitting position that disconnect the drive force of the motor from the first link, and a biasing element biasing the drive link into engagement with the output member to maintain the drive link in the drive transmitting position.

18 Claims, 10 Drawing Sheets

BICYCLE DERAILLEUR

BACKGROUND

1. Field of the Invention

This invention generally relates to a bicycle derailleur. More specifically, the present invention relates to an electric derailleur having a saver mechanism.

2. Background Information

A bicycle typically uses a chain drive transmission for transmitting a pedaling force to a rear wheel. The chain drive transmission of a bicycle often uses derailleurs to selectively move a chain from one of a plurality of sprockets to another for changing speeds of the bicycle. A typical derailleur has a base member, a movable member supporting a chain guide and a linkage assembly (e.g., a moving mechanism) coupled between the base member and the movable member so that the chain guide moves laterally relative to the base member. Recently, derailleurs have been equipped with motor units to make shifting gears easier.

SUMMARY

Generally, the present disclosure discloses various features of a bicycle derailleur. In one feature, a bicycle derailleur is provided that includes a saver mechanism for protecting a motor unit of the bicycle derailleur.

In view of the state of the known technology, a bicycle derailleur is provided that basically includes a base member, a movable member, a motor unit, a linkage and a saver mechanism. The base member is configured to be mounted to a bicycle. The movable member is movably coupled to the base member. The motor unit is operatively arranged to move the movable member with respect to the base member. The linkage includes a first link pivotally connected to the base member and the movable member. The first link includes a first linking member and a second linking member. The first linking member is pivotally connected to the movable member. The second linking member is pivotally connected to the base member and being attached to the first linking member. The saver mechanism includes an output member movably operated by the motor unit, a drive link movably mounted on the first link between a drive transmitting position that connects a drive force of the motor to the first link and a non-drive transmitting position that disconnect the drive force of the motor from the first link, and a biasing element biasing the drive link into engagement with the output member to maintain the drive link in the drive transmitting position.

Other objects, features, aspects and advantages of the disclosed bicycle derailleur will become apparent to those skilled in the art from the following detailed description, which, taken in conjunction with the annexed drawings, discloses one embodiment of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
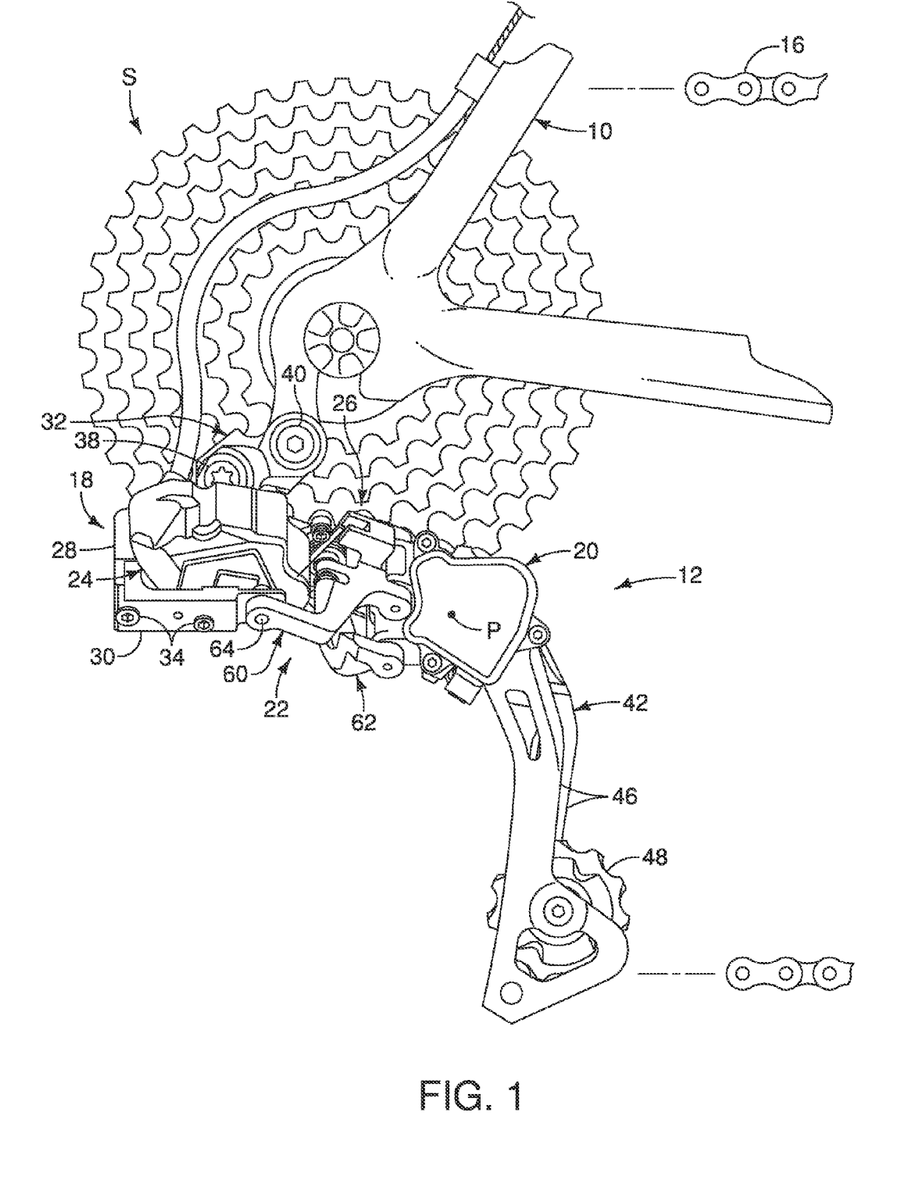
FIG. 1 is a partial side elevational view of a rear portion of a bicycle with a bicycle rear derailleur in a low operating position.

Referring initially to FIG. 1, a rear portion of a bicycle 10 is illustrated that includes, among other things, a bicycle rear derailleur 12 in accordance with an illustrated embodiment. The rear derailleur 12 is secured to a rear portion of a bicycle frame 14 in a conventional manner as discussed below. The rear derailleur 12 is operated by an electric rear shifter (not shown), which is a shift actuating device. The electric rear shifter operates the rear derailleur 12 between a plurality of shift stage (gear) positions such that a chain 16 is moved by the rear derailleur 12 in a lateral direction between a plurality of rear sprockets S. The rear derailleur 12 is illustrated in a low shift stage (gear) position in FIG. 1. As used herein, the term "low shift stage (gear) position" refers to the rear derailleur 12 being in an operating that corresponds to the chain 16 being guided onto the rear sprocket S with the largest number of teeth. As used herein, the term "top shift stage (gear) position" refers to the rear derailleur 12 being in an operating position that corresponds to the chain 16 being guided onto the rear sprocket S with the smallest number of teeth.

The bicycle rear derailleur 12 basically includes a base member 18, a movable member 20 and a linkage 22. A motor unit 24 is operatively coupled to the linkage 22 to move the movable member 20 with respect to the base member 18. Thus, in the illustrated embodiment, the rear derailleur 12 constitutes an electric or motorized rear derailleur. A saver mechanism 26 operatively couples the motor unit 24 to the linkage 22 to provide protection for the motor unit 24 as discussed below.

Figure 2:
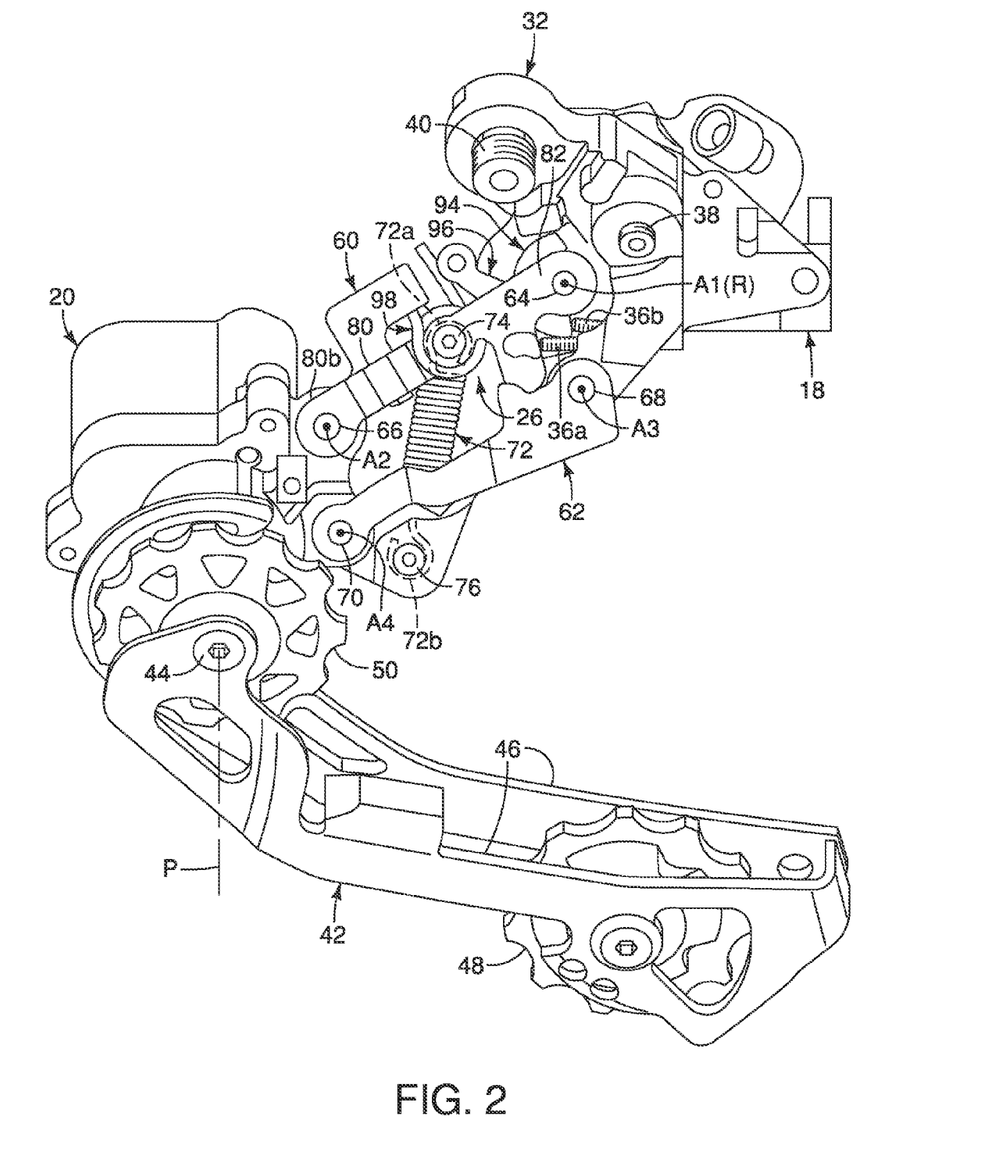
FIG. 2 is a frame side perspective view of the rear derailleur illustrated in FIG. 1 with the rear derailleur in the low operating position when a chain is not engaged.

In the illustrated embodiment, the base member 18 includes a first bracket member 28, a second bracket member 30 and a bracket axle unit 32. The first and second bracket members 28 and 30 are preferably constructed of a hard rigid material such as a lightweight metal (e.g., an aluminum alloy. The first and second bracket members 28 and 30 are fixed together by a pair of bolts 34. The motor unit 24 is supported between the first and second bracket members 28 and 30 with one of the bolts 34 passing through the motor unit 24 to secure the motor unit 24 to the base member 18. As seen in FIG. 2, the first bracket member 28 also includes a low shift stage adjustment screw 36a and a top shift stage adjustment screw 36b for setting range of movement of the movable member 20 with respect to the base member 18. The bracket axle unit 32 is attached to the first bracket member 28 by a bolt 38. The bracket axle unit 32 includes a fixing bolt 40. The fixing bolt 40 is threaded into a threaded hole of the bicycle frame 14. Thus, the base member 18 is configured to be mounted to the bicycle 10 by the fixing bolt 40.

Figure 3:
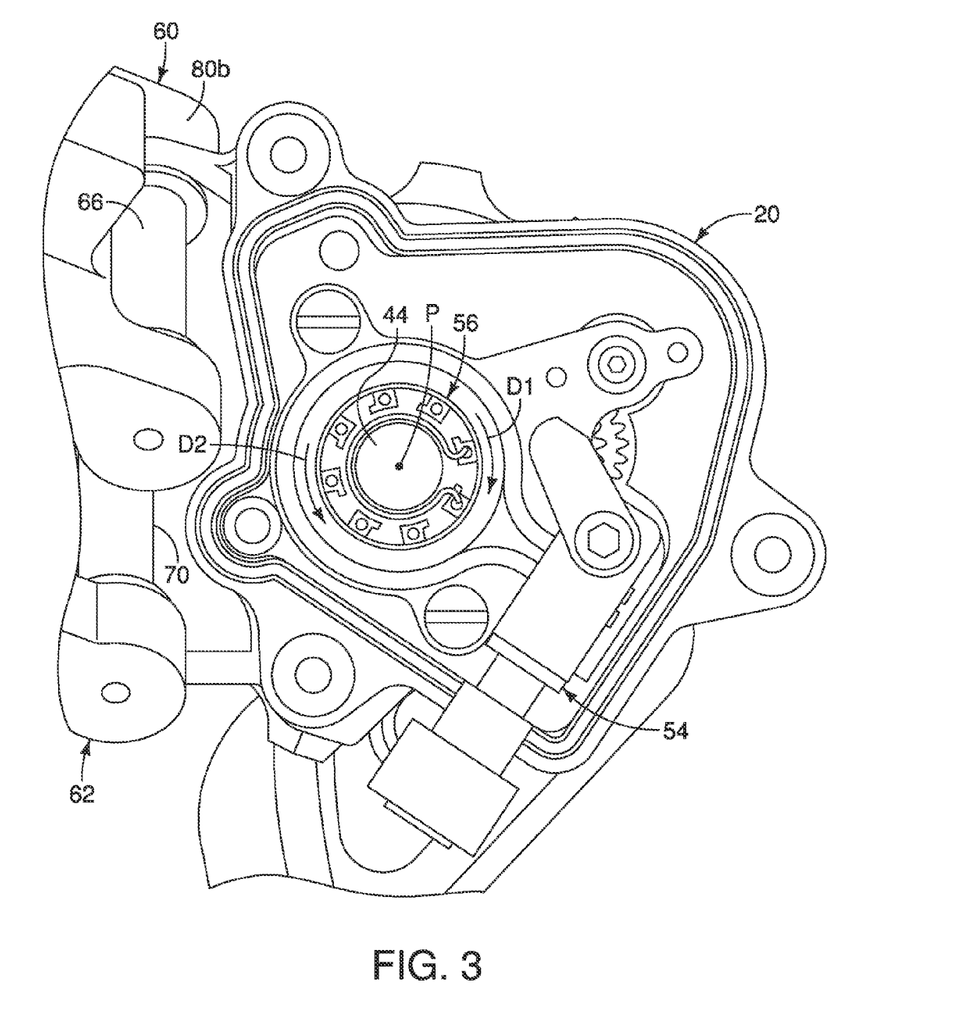
FIG. 3 is a partial side elevational view of a rear portion of a bicycle with a rear derailleur in a low operating position when a cover member of the movable member is detached.

As seen in FIGS. 1 to 3, the movable member 20 is movably coupled to the base member 18 by the linkage 22. The movable member 20 includes a chain guide 42 pivotally coupled to the movable member 20 by an axle 44 to pivot about chain guide pivot axis P, which is sometimes called the P-axis of the rear derailleur. The axle 44 is made of several pieces (not shown) to aid in the assembly of the movable member 20 and the attachment of the chain guide 42 to the movable member 20.

Figure 4:
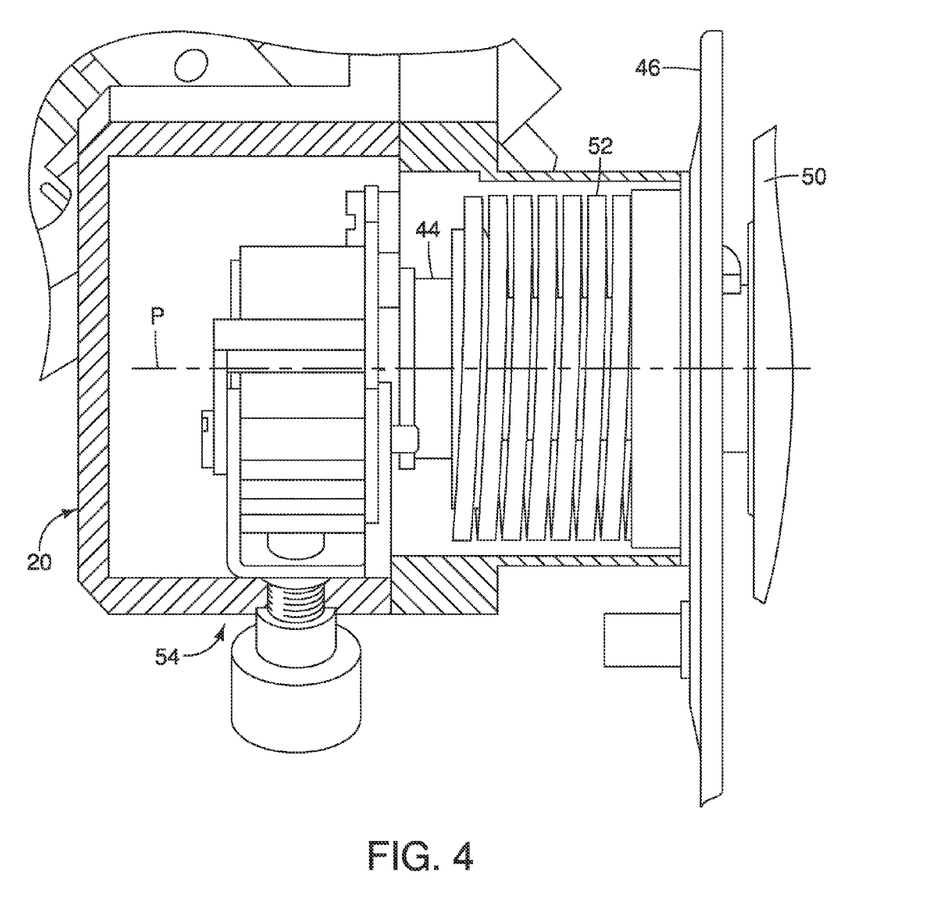
FIG. 4 is a cross sectional view of a rear portion of a bicycle with a rear derailleur in a low operating position.
Figure 5:
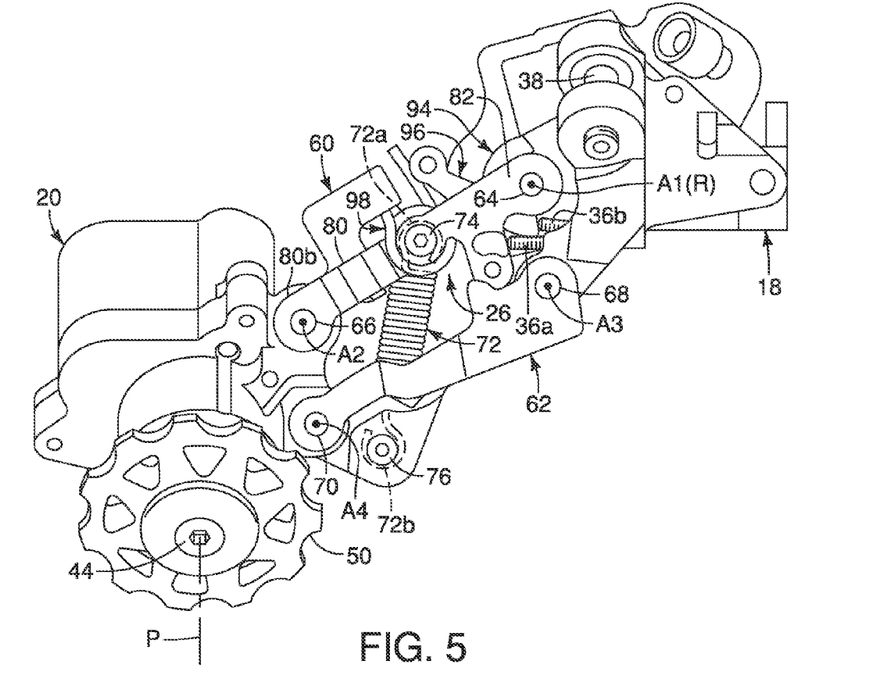
FIG. 5 is a frame side perspective view of selected parts of the rear derailleur of FIGS. 1 and 2 with the rear derailleur in the low operating position.
Figure 6:
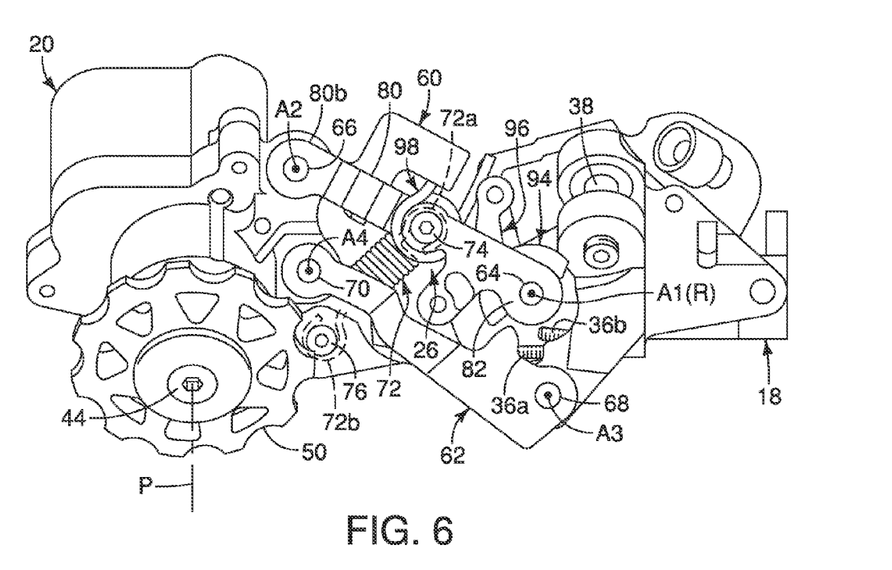
FIG. 6 is a frame side perspective view of selected parts of the rear derailleur of FIGS. 1 and 2 with the rear derailleur moved from the low operating position of FIG. 5 to an intermediate operating position.
Figure 7:
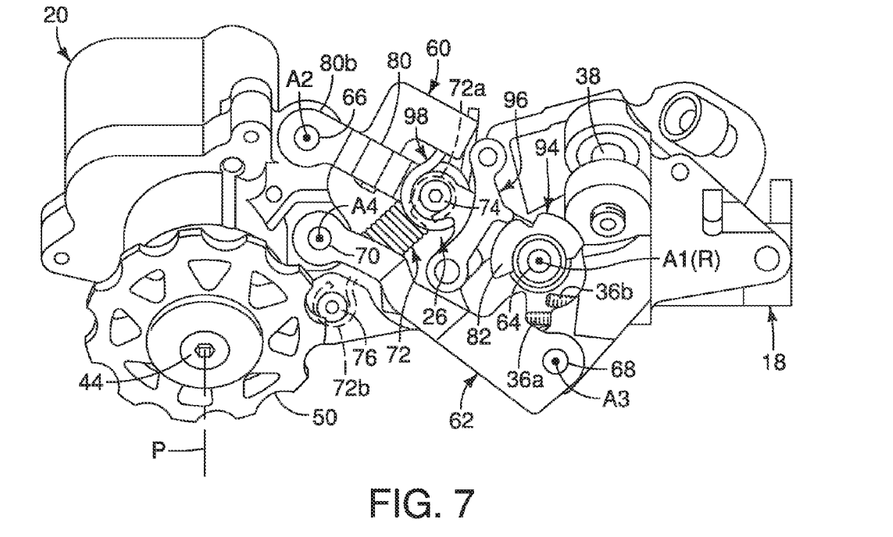
FIG. 7 is a frame side perspective view of the selected parts of the rear derailleur of FIG. 6 with the saver mechanism in a first non-drive transmitting position.
Figure 8:
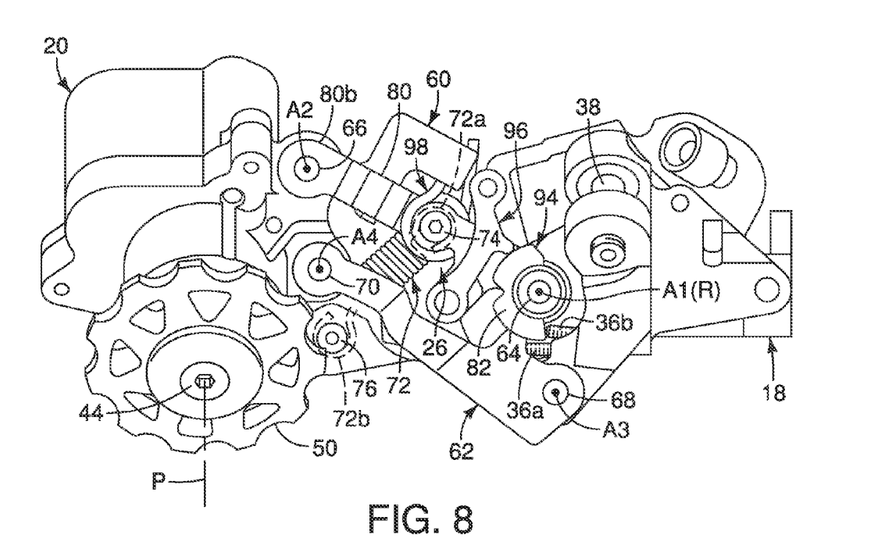
FIG. 8 is a frame side perspective view of the selected parts of the rear derailleur of FIG. 6 with the saver mechanism in a second non-drive transmitting position.
Figure 9:
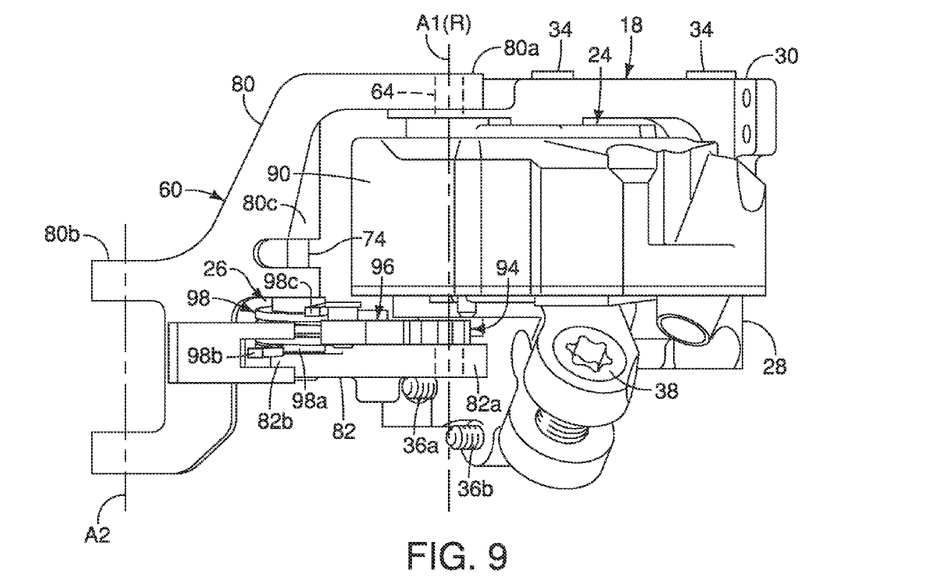
FIG. 9 is a top plan view of selected parts of the rear derailleur of FIGS. 1 and 2 showing the base member supporting the motor unit and the outer link operatively coupled to the motor unit via the saver mechanism.
Figure 10:
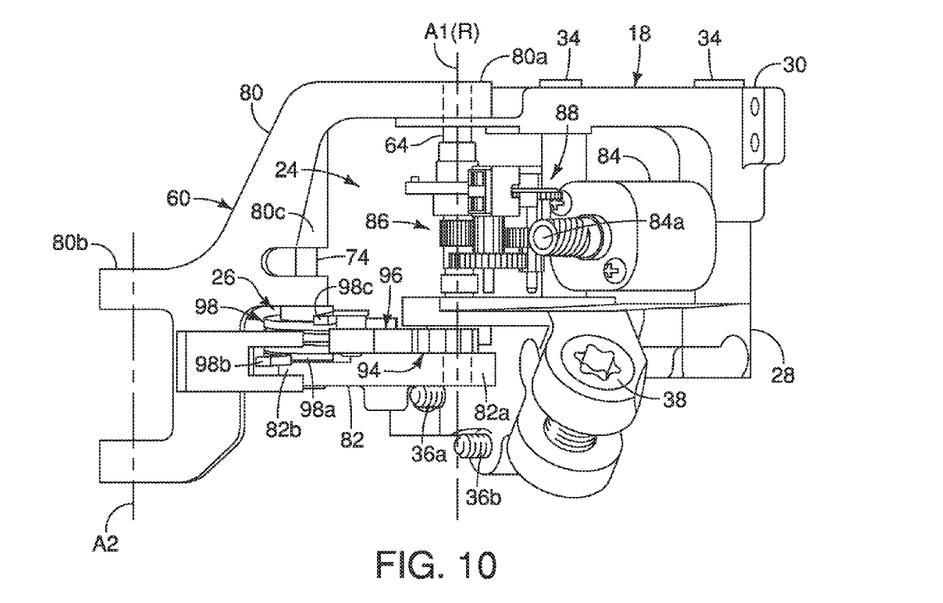
FIG. 10 is a top plan view of selected parts of the rear derailleur of FIGS. 1 and 2 showing internal components of the motor unit.
Figure 11:
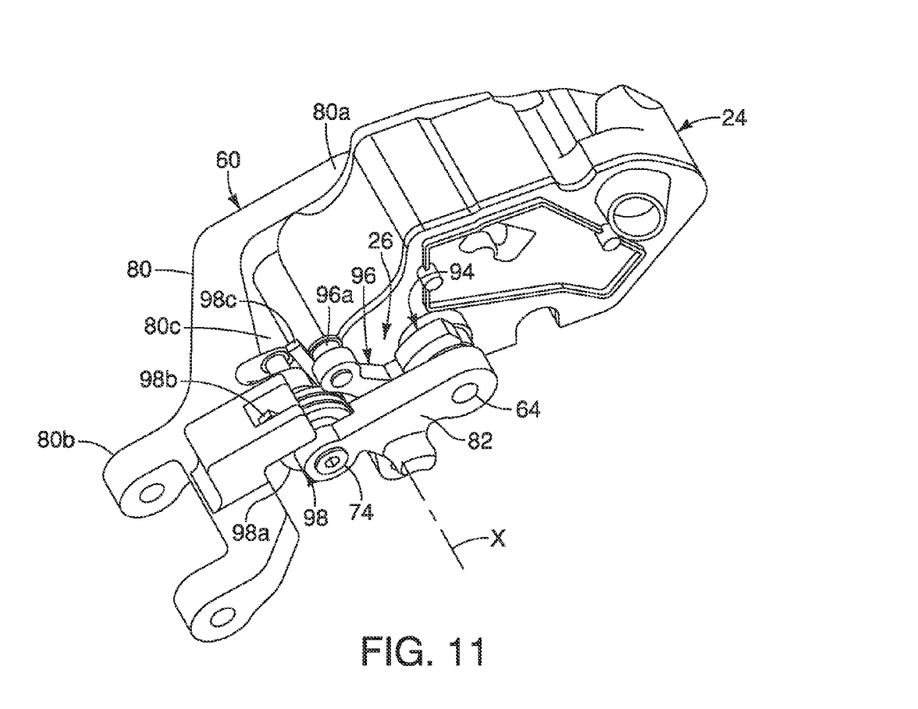
FIG. 11 is a frame side perspective view of the selected parts of the rear derailleur of FIGS. 1 and 5 showing the motor unit and the outer link operatively coupled to the motor unit via the saver mechanism.
Figure 12:
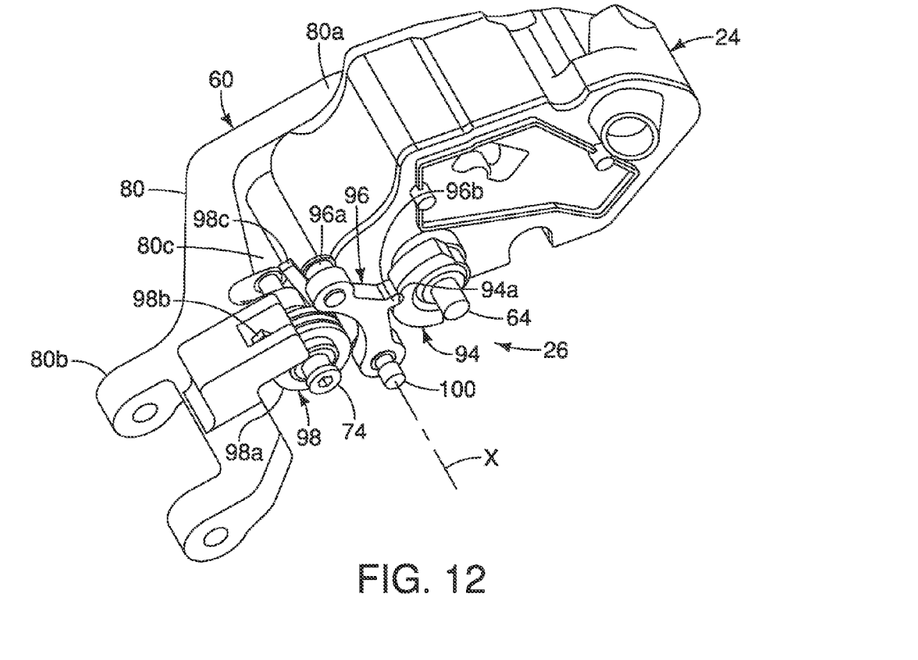
FIG. 12 is a frame side perspective view of the motor unit, the outer link and the saver mechanism of the rear derailleur of FIGS. 1 and 2, but with the drive link removed.
Figure 13:
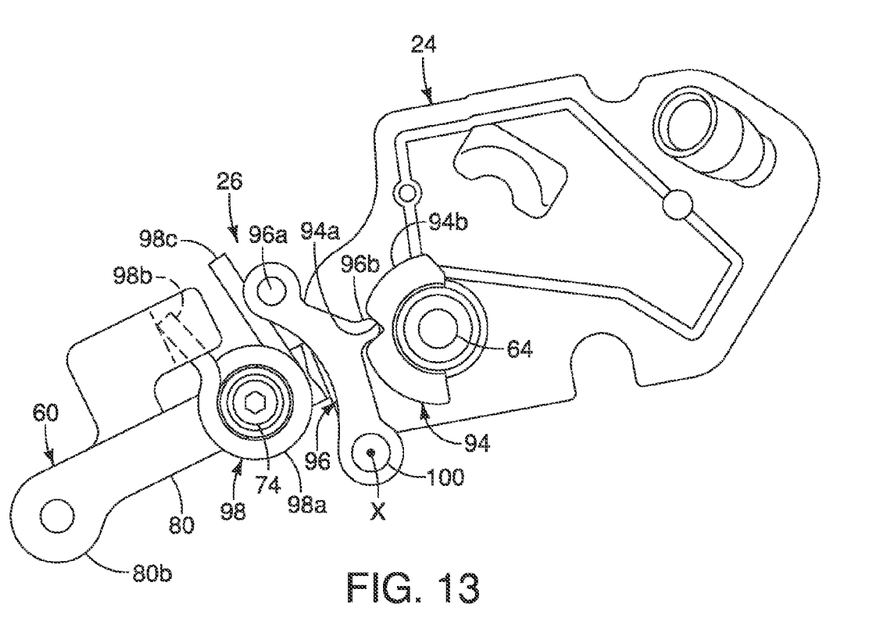
FIG. 13 is another frame side view of the motor unit, the outer link and the saver mechanism of the rear derailleur of FIGS. 1 and 2, but with the drive link removed.
Figure 14:
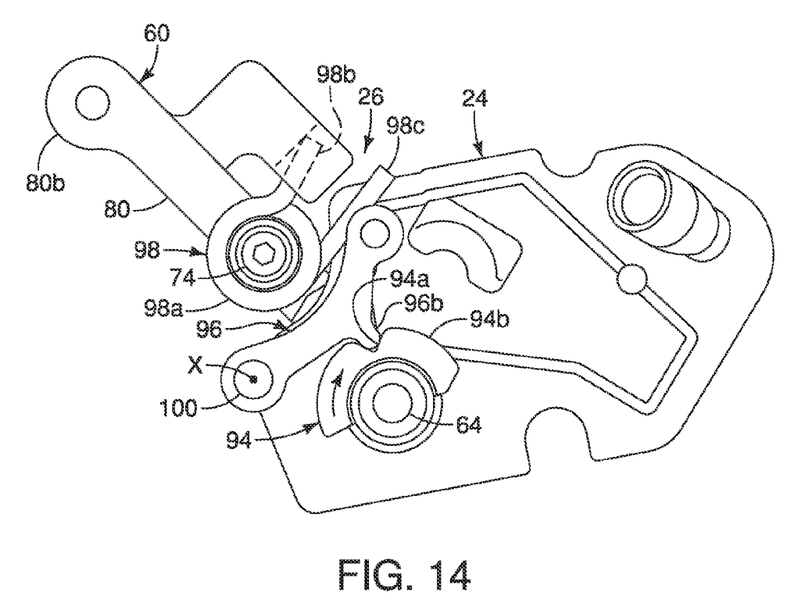
FIG. 14 is a frame side view, similar to FIG. 13, of the motor unit, the outer link and the saver mechanism of the rear derailleur of FIGS. 1 and 2, but with outer link moved to the top operating position.

As best seen in FIGS. 2 and 3, the chain guide 42 basically includes a pair of chain cage plates 46, a tension pulley 48 and the guide pulley 50 rotatably disposed between the chain cage plates 46. In the illustrated embodiment, the guide pulley 50 is rotatably disposed on the axle 44, while the chain guide 42 is non-rotatably mounted to the axle 44. As seen in FIG. 4, a biasing element 52 is provided between the movable member 20 and the chain guide 42 to bias the chain guide 42 around the chain guide pivot axis P in a first rotational direction D1. Thus, the first rotational direction D1 is a clockwise rotational direction of the chain guide 42 around the chain guide pivot axis P while being viewed along the chain guide pivot axis P from the non-frame facing side of the movable member 20. In this illustrated embodiment, the biasing element 52 is a torsion spring having a coiled portion disposed around the axle 44, a first spring end engaged with the movable member 20 and a second spring end engaged with the chain guide 42.

In the illustrated embodiment, the movable member 20 is provided with a friction element 54 operatively arranged between the movable member 20 and the chain guide 42 to frictionally provide rotational resistance in a second rotational direction D2 of the chain guide 42 about the chain guide pivot axis P. Preferably, friction element 54 is adjustable to vary the rotational resistance provided by the friction element 54. Basically, the friction element 54 increases an operation energy of the motor unit 24 as the motor unit 24 moves the movable member 20 toward the low shift stage position with respect to the base member 18. The friction element 54 constitutes a resistance applying element. In this illustrated embodiment, a one-way clutch 56 is disposed between the friction element 54 and the axle 44. The friction element 54 applies resistance to the rotational movement of the chain guide 42 in the second rotational direction D2 with respect to the movable member 20. In particular, the friction element 54 applies frictional resistance to rotational movement of the chain guide 42 by applying frictional resistance to the rotation of one-way clutch 56. Since resistance applying elements and one-way clutches similar to the friction element 54 and the one-way clutch 56 are discussed in detail in U.S. Patent Application Publication No. 2012/0083371, the friction element 54 and the one-way clutch 56 will not be discussed in further detail herein.

The linkage 22 operatively connects the movable member 20 to the base member 18, In the illustrated embodiment, the linkage 22 includes a first or outer link 60 and a second or inner link 62. The outer link 60 is pivotally connected to the base member 18 by an output shaft 64 of the motor unit 24 about a first pivot axis A1. The outer link 60 is pivotally connected to the movable member 20 by a pivot pin 66 about a second pivot axis A2. The inner link 62 is pivotally connected the base member 18 by a pivot pin 68 about a third pivot axis A3 and the movable member 20 by a pivot pin 70 about a fourth pivot axis A4. Thus, the outer and inner links 60 and 62 have first ends pivotally connected to the base member 18 and second ends pivotally connected to the movable member 20 to define a four bar linkage arrangement.

As seen in FIG. 2, the linkage 22 further includes a biasing member 72 that is interposed between the outer and inner links 60 and 62 to bias the movable member 20 towards one of a low shift stage position and a top shift stage position. In the illustrated embodiment, the biasing member 72 is a coil tension spring that biases the movable member 20 towards the low shift stage position. In particular, the biasing member 72 has a first end 72a connected to the outer link 60 by a first mounting element 74 (e.g., a screw as shown, a press-fitted pin or other suitable mounting element) and a second end 72b connected to the inner link 62 by a second mounting element 76 (e.g., a screw as shown, a press-fitted pin or other suitable mounting element). With this arrangement, the biasing member 72 is stretched as the movable member 20 moves from the tow shift stage position to the top shift stage position. In the low shift stage position, the biasing member 72 is preloaded (slightly stretched) so that the outer link 60 contacts a tip of a low shift stage adjustment screw 36a as seen in FIG. 2.

The biasing member 72. aids in taking up play or clearance between the gears of the motor unit 24 and other manufacturing tolerances in the manufacture of the rear derailleur 12. As a result, when the motor unit 24 is operated in a first rotational amount from a first position to a second position, and then the motor unit 24 is subsequently operated in a second rotational amount from the second position to the first position, the first and second rotational amounts may become slightly different position if the biasing member 72 is not provided to bias the movable member 22 in one direction. Thus, the biasing member 72 improves the stability of the shift positions of the rear derailleur 12.

In the illustrated embodiment, the outer link 60 includes a first linking member 80 and a second linking member 82. A first end 80a of the first linking member 80 is pivotally connected to the base member 18 by a first end of the output shaft 64 of the motor unit 24 about the first pivot axis A1. Specifically, the first end 80a of the first linking member 80 is not fixed to the output shaft 64, but rather the output shaft 64 can rotate relative to the first end 80a of the first linking member 80. The second linking member 82 is rotatably mounted on a second end of the output shaft 64 of the motor unit 24. When assembling the rear derailleur 12, it is easy to attach the outer link 60 to the output shaft 64 of the motor unit 24 as pivot shaft of the outer link 60 because the outer link 60 constructed by a plural parts. A second end 80b of the first linking member 80 is pivotally connected to the movable member 20 by the pivot pin 66 about the second pivot axis A2. A first end 82a of the second linking member 82 is pivotally connected to the base member 18 by the output shaft 64 of the motor unit 24 about the first pivot axis A1, Specifically, the first end 82a of the second linking member 82 is not fixed to the output shaft 64, but rather the output shaft 64 can rotate relative to the first end 82a of the second linking member 82. A second end 82b of the second linking member 82 is fixedly attached to an intermediate portion 80c of the first linking member 80 by the mounting element 74.

Now the motor unit 24 will be discussed in more detail. The motor unit 24 includes a motor 84, a gear reduction unit 86 and a shift stage position sensor 88. The motor 84, the gear reduction unit 86 and the shift stage position sensor 88 are disposed inside a motor housing 90 that is supported on the base member 18. The motor 84 is a reversible electric motor. Rotation of the output shaft 64 in one direction moves the movable member 20 and the chain guide 12 toward a low shift stage position with respect to the base member 18, and that rotation of the output shaft 64 in the other direction moves the movable member 20 and the chain guide 42 toward a top shift stage position with respect to the base member 18. The output shaft 64 of the motor unit 24 is connected to an output shaft 84a of the motor 84 by the gear reduction unit 86. The output shaft 64 of the motor unit 24 is connected the outer link 60 by the saver mechanism 26 as discussed below. In the illustrated embodiment, the shift stage position sensor 88 is a digital position sensor that this mounted on the gear reduction unit 86 to detect movement of one of the parts of the gear reduction unit 86. More particularly, the shift stage position sensor 88 of the illustrated embodiment is formed by a position sensor shutter wheel and a dual channel photo interrupter having a light source or LED that is disposed on one side of the shutter wheel and a phototransistor (e.g., a light detector) disposed on the other side of the shutter wheel.

The output shaft 64 of the motor unit 24 is rotatably mounted to within motor housing 90 to project out of opposite ends of the motor housing 90 to pivotally support the outer link 60 on the base member 18, The output shall 64 of the motor unit 24 has a rotational axis R that is parallel to the first pivot axis A1 and the second pivot axis A2. In this embodiment, the rotational axis R is also parallel to the third pivot axis A3 and the fourth pivot axis A4. The rotational axis R of the output shaft 64 and the first pivot axis A1 are coaxial in the illustrated embodiment. The output shaft 64 of the motor unit 24 drives the outer link 60 to move the movable member 20 with respect to the base member 18. The inner link 62 moves in response to movement of the outer link 60. Basically, a movement force of the output shaft 64 of the motor unit 24 is transmitted to the outer link 60 at the intermediate portion 80c, which is located between the first and second pivot axes A1 and A2 of the outer link 60 by the saver mechanism 26.

Now the saver mechanism 26 will be discussed in more detail with reference to FIGS. 12 to 16. The saver mechanism 26 includes an output member 94, a drive link 96 and a biasing element 98. The saver mechanism 26 basically performs two functions. First, the saver mechanism 26 normally transmits a drive force of the motor 84 to the outer link 60 for moving the movable member 20 with respect to the base member 18. Second, the saver mechanism 26 stops the transmission of a drive force of the motor 84 to the outer link 60 such that the motor unit 84 can continue to operate even though the movable member 20 will not move with respect to the base member 18 (e.g. becomes jammed), or the force to move the movable member 20 with respect to the base member 18 becomes greater than a prescribed operating force. In this way, the motor unit 84 is protected by the saver mechanism 26 in certain situations.

Figure 15:
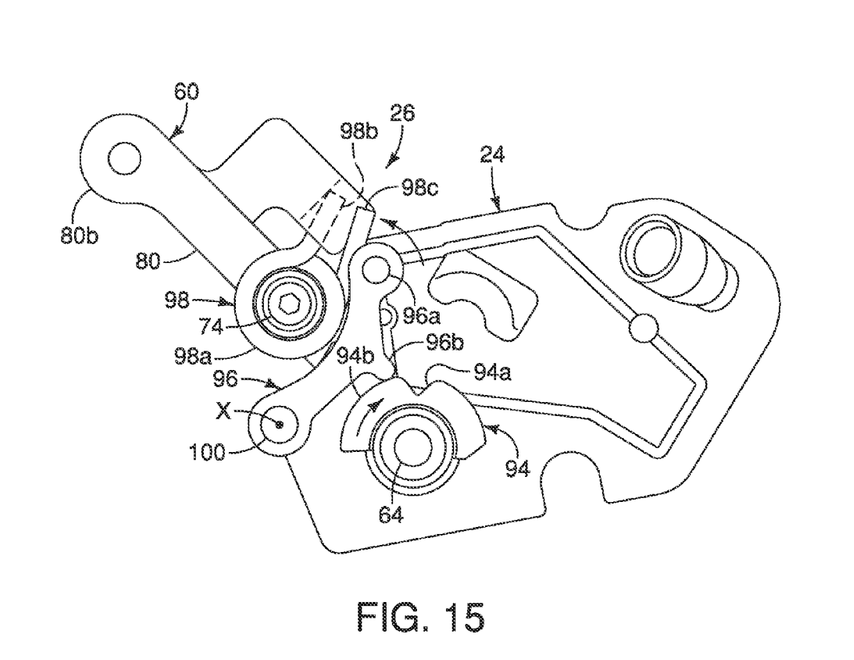
FIG. 15 is a frame side view of the selected parts of the rear derailleur of FIG. 6 with the saver mechanism in the first non-drive transmitting position.
Figure 16:
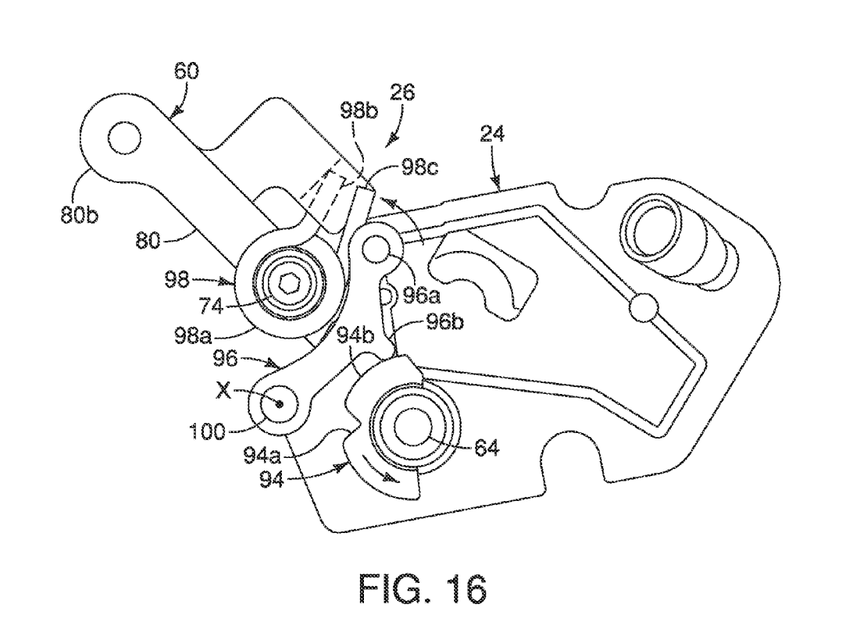
FIG. 16 is a frame side view of the selected parts of the rear derailleur of FIG. 6 with the saver mechanism in the second non-drive transmitting position.

As seen in FIGS. 15 to 16, the output member 94 is movably operated by the motor 84 of the motor unit 24. In particular, the output member 94 is fixed on the output shaft 64 of the motor unit 24 to rotate with the output shaft 64. For example, the output member 94 is fixed to the output shaft 64 of the motor unit 24 by a spline connection as illustrated. In this way, the output member 94 is turned as the output shaft 64 of the motor unit 24 is turned by the operation of the motor 84. The movement force (i.e., torque) of the output member 94 is transmitted by the drive link. 96 to the outer link 60 at the intermediate portion 80c of the first linking member 80, which is located between the first and second pivot axes A1 and A2 of the outer link 60. More specifically, the drive link 96 is movably mounted on the outer link 60 between a drive transmitting position that connects a drive force of the motor 84 to the outer link 60 and a non-drive transmitting position that disconnect the drive force of the motor 84 from the outer link 60. The biasing element 98 applies a biasing force on the drive link 96 to bias the drive link 96 into contact with the output member 94. The drive link 96 engages the output member 94 to move together while the drive link 96 is in the drive transmitting position. On the other hand, the drive link 96 disengages from the output member 94 to provide relative movement between the drive link. 96 and the output member 94 while the drive link 96 is in the non-drive transmitting position. The drive link 96 moves from the drive transmitting position to the non-drive transmitting position upon a prescribed resistance occurring in the outer link 60, which overcomes the biasing force of the biasing element 98 on the drive link 96.

As seen in FIGS. 15 to 16, the biasing element 98 applies a biasing force on the drive link 96 to bias the drive link 96 into engagement with the output member 94. Thus, the output shaft 64 of the motor unit 24 is linked to the outer link 60 by the output member 94 and the drive link 96 as a result of the biasing element 98 such that the drive force of the motor 84 is transmitted to the outer link 60 for moving the movable member 20 with respect to the base member 18. The biasing element 98 applies a biasing force on the drive link 96 into engagement with the output member 94 to maintain the drive link 96 in the drive transmitting position. Thus, this arrangement of the output member 94, the drive link 96 and the biasing element 98 for provides an ovenidable connection between the output shaft 64 of the motor unit 24 and the outer ink 60 in which the connection between the output shaft 64 of the motor unit 24 and the outer link 60 is switched from the drive transmitting position to the non-drive transmitting position upon the force required to move the movable member 20 with respect to the base member 18 becoming greater than a prescribed operating force.

More specifically, in the illustrated embodiment, the drive link 96 is pivotally mounted to the second linking member 82 by a pivot pin 100 that defines a pivot axis X. The drive link 96 includes a contact portion 96a that receives the biasing force of the biasing element 98 and an output engagement portion 96b that engages the output member 94 to establish the drive transmitting position. The output engagement portion 96b is located between the contact portion 96a and the pivot axis X where the drive link 96 is pivotally mounted on the second linking member 82. In the illustrated embodiment, the overridable connection between the output shaft 64 of the motor unit 24 and the outer link 60 is established by providing one of the output engagement portion 96b and the output member 94 with a notch and the other of the output engagement portion 96b and the output member 94 with a protrusion that mates with the notch to establish the drive transmitting position. For example, as illustrated, the output member 94 includes a notch 94a and the output engagement portion 96b is a protrusion that mates with the notch 94a to establish the drive transmitting position.

In the illustrated embodiment, the biasing element 98 is a coil spring that is mounted on the mounting element 74 that attaches the second linking member 82 to the first linking member 80. In particular, the biasing element 98 has a coil portion 98a disposed on the mounting element 74, a first end portion 98b contacting the first linking member 80 and a second end portion 98c contacting the drive link 96. As mentioned above, one end of the biasing member 72 is also connected to the mounting element 74. Thus, the mounting element 74 performs several functions to provide a compact arrangement with a minimal number of parts.

FIGS. 7, 8, 15 and 16 illustrate situations in which the movable member 20 will not move with respect to the base member 18 (e.g. becomes jammed), or for some reason the force to move the movable member 20 with respect to the base member 18 becomes greater than a prescribed operating force, which is determined by the biasing force of the biasing element 98. If the movable member 20 becomes stuck, and the output shaft 64 of the motor unit 24 is driven by the motor 84, the saver mechanism 26 will permit the output shaft 64 of the motor unit 24 to rotate, In particular, the output member 94 will act as a cam that moves the drive link 96 against the biasing force of the biasing element 98. This movement of the drive link 96 by the output member 94 against the biasing force of the biasing element 98 results in the output engagement portion 96b protrusion) of the drive link 96 being forced out of the notch 94a of the output member 94 and onto a cam surface 94b of the output member 94. Once the output engagement portion 96b is resting on the cam surface 94b, the output shaft 64 of the motor unit 24 can rotate without transmitting the drive force to the outer link 60. The cam surface 94b of the output member 94 extends in both circumferential directions from the notch 94a of the output member 94, In this way, the motor 84 is protected in both operating directions.

The term "connect" or "connected", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e. one element is unitary part of the the other element, For example, the magnetized part can be directly secured to the crank arm attachment part, or can be indirectly secured to the crank arm attachment part through intermediate member(s), or can be integral with the crank arm attachment part. This definition also applies to words of similar meaning, for example, the terms "attach" "attached", "join", "joined", "fix", "fixed", "bond", "bonded", "couple", "coupled " and their derivatives.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
   a base member configured to be mounted to a bicycle;
   a movable member movably coupled to the base member;
   a motor unit operatively arranged to move the movable member with respect to the base member;
   a linkage including a first link pivotally connected to the base member and the movable member, the first link including a first linking member and a second linking member, the first linking member being pivotally connected to the movable member, the second linking member being pivotally connected to the base member, the second linking member being a separate member from the first linking member, the second linking member being attached to the first linking member; and
   a saver mechanism including an output member movably operated by the motor unit, a drive link movably mounted on the first link between a drive transmitting position that connects a drive force of the motor to the first link and a non-drive transmitting position that disconnects the drive force of the motor from the first link, and a biasing element biasing the drive link into engagement with the output member to maintain the drive link in the drive transmitting position, the saver mechanism being supported between the first and second linking members.

2. A bicycle derailleur comprising;
   a base member configured to be mounted to a bicycle;
   a movable member movably coupled to the base member;
   a motor unit operatively arranged to move the movable member with respect to the base member;
   a linkage including a first link pivotally connected to the base member and the movable member, the first link including a first linking member and a second linking member, the first linking member being pivotally connected to the movable member, the second linking member being pivotally connected to the base member and being attached to the first linking member; and
   a saver mechanism including an output member movably operated by the motor unit, a drive link movably mounted on the first link between a drive transmitting position that connects a drive force of the motor to the first link and a non-drive transmitting position that disconnects the drive force of the motor from the first link, and a biasing element mounted on a mounting element that attaches the second linking member to the first linking member, the biasing element biasing the drive link into engagement with the output member to maintain the drive link in the drive transmitting position.

3. The bicycle derailleur according to claim 2, wherein the biasing element is a coil spring having a coil portion disposed on the mounting element and a first end portion contacting the first linking member and a second end portion. contacting the drive link.

4. The bicycle derailleur according to claim 1, wherein the linkage includes a second link and a biasing member that is interposed between the first and second links to bias the movable member towards one of a low shift stage position and a top shift stage position.

5. A bicycle derailleur comprising:
a base member configured to be mounted to a bicycle;
a movable member movably coupled to the base member;
motor unit operatively arranged to move the movable member with respect to the base member;
a linkage including a first link and a second link, the first link pivotally connected to the base member and the movable member and including a first linking member and a second linking member, the first linking member being pivotally connected to the movable member, the second linking member being pivotally connected to the base member and being attached to the first linking member; and
a saver mechanism including an output member movably operated by the motor unit, a drive link movably mounted on the first link between a drive transmitting position that connects a drive force of the motor to the first link and a non-drive transmitting position that disconnects the drive force of the motor from the first link, and a biasing element mounted on a mounting element that attaches the second linking member to the first linking member, one end of the biasing member is connected to the mounting element, the biasing element biasing the drive link into engagement with the output member to maintain the drive link in the drive transmitting position.

6. The bicycle derailleur according to claim 1, wherein the drive link is pivotally mounted on the second linking member.

7. The bicycle derailleur according to claim 6, wherein. the drive link includes a contact portion that receives the biasing force of the biasing element and an output engagement portion that engages the output member to establish the drive transmitting position.

8. The bicycle derailleur according to claim 7, wherein one of the output engagement portion and the output member includes a notch and the other of the output engagement portion and the output member includes a protrusion that mates with the notch to establish the drive transmitting position.

9. The bicycle derailleur according to claim 7, wherein the output engagement portion is located between the contact portion and a pivot axis where the drive link is pivotally mounted on the second linking member.

10. The bicycle derailleur according to claim 1, wherein the drive link moves from the drive transmitting position to the non-drive transmitting position upon a prescribed resistance occurring in the first link.

11. The bicycle derailleur according to claim 1, wherein the drive link engages the output member to move together while the drive link is in the drive transmitting position, and the drive link disengages from the output member to provide relative movement between the drive link and the output member while the drive link is in the non-drive transmitting position.

12. The bicycle derailleur according to claim 1, wherein the second linking member is rotatably mounted on an output shaft of the motor unit.

13. The bicycle derailleur according to claim 12, wherein the output member is fixed on the output shaft of the motor unit to rotate with the output shaft, 14. The bicycle derailleur according to claim 1, wherein the movable member includes a chain guide pivotally coupled to the movable member about a chain guide pivot axis.

15. The bicycle derailleur according to claim 14, further comprising
a friction element operatively arranged between the movable member and the chain guide to frictionally provide rotational resistance in a first rotational direction of the chain guide about the chain guide pivot axis.

16. The bicycle derailleur according to claim 1, wherein the first linking member and the output member are coaxially connected to the base member.

17. The bicycle derailleur according to claim 16, wherein the second linking member and the output member are coaxially connected to the base member.

18. The bicycle derailleur according to claim 1, wherein the first linking member, the second linking member and the output member are pivotally connected to the base member by an output shaft.

* * * * *